United States Patent [19]

Wenzel

[11] Patent Number: 4,947,550

[45] Date of Patent: Aug. 14, 1990

[54] GUIDEBAR WITH OIL CHANNELS

[75] Inventor: Gerhard Wenzel, Gavle, Sweden

[73] Assignee: Sandvik AB, Sandviken, Sweden

[21] Appl. No.: 326,878

[22] Filed: Mar. 21, 1989

[30] Foreign Application Priority Data

Mar. 24, 1988 [SE] Sweden ................................ 8801086

[51] Int. Cl.[5] ........................ B23D 59/04; B23D 59/00; B25F 3/00; B23Q 11/12

[52] U.S. Cl. ................................... 30/123.4; 30/123.3; 30/384; 30/387

[58] Field of Search ..................... 30/123.4, 123.3, 383, 30/384, 385, 387; 83/169, 818

[56] References Cited

U.S. PATENT DOCUMENTS

| | | | |
|---|---|---|---|
| 2,748,810 | 6/1956 | Strunk | 30/123.4 |
| 2,913,020 | 11/1959 | Nielsen | 30/123.4 |
| 2,962,061 | 11/1960 | Nielsen | 30/123.4 |
| 2,992,660 | 7/1961 | Merz . | |
| 3,044,506 | 7/1962 | Oehrli | 30/123.4 |
| 4,361,960 | 12/1982 | Halverson | 30/123.4 |

FOREIGN PATENT DOCUMENTS

| | | | |
|---|---|---|---|
| 908296 | 4/1954 | Fed. Rep. of Germany | 30/123.4 |
| 756690 | 12/1933 | France . | |
| 380996 | 11/1975 | Sweden . | |
| 438812 | 5/1985 | Sweden . | |
| 406725 | 4/1974 | U.S.S.R. . | |

*Primary Examiner*—Douglas D. Watts
*Assistant Examiner*—Paul M. Heyrana
*Attorney, Agent, or Firm*—Burns, Doane, Swecker & Mathis

[57] ABSTRACT

A guide bar for a chain saw with closed oil channels, arranged to lubricate the inside of the chain just before it starts sliding against the underside of the guidebar, as well as the supporting teeth of the nose sprocket just before the intermesh with the chain.

7 Claims, 1 Drawing Sheet

GUIDEBAR WITH OIL CHANNELS

BACKGROUND AND OBJECTS OF THE INVENTION

Guidebars for chainsaws are normally provided with oil holes at the clamping end, through which oil is pumped into the bottom of the chain groove on the upper side of the guidebar where the chain has left the drive sprocket and moves forward towards the nose part of the guidebar. The parts of the guidebar which need lubrication are the underside, where the chain during sawing is pressed against the guidebar, and the nose part, where the chain becuase of its curvature exerts high pressure against the nose sprocket, or on older guidebar types on the hardened edge of the guidebar. Because of the long distance from the oil hole to the nose part and the underside, the lubricating oil takes a long time to reach there, especially if sawdust has collected at the bottom of the chain grooves.

Chainsaws are increasingly often used as components of vehicle-borne machines for felling and bucking of tree trunks, and then the running conditions differ from hand-held chainsaws, in that the guidebar for each cut is active for a much shorter period with much higher chain velocity and a much higher force against the tree trunk. There is a strong need of improved lubrication, and at the same time the time available is less, since the oil flow can not be maintained the whole time but only during the cut proper, as is described in the Swedish Pat. No. 380,996.

Under these circumstances it is desirable to ensure that the oil immediately reaches the nose part, which can be achieved by not connecting the oil holes to the upper rear end of the chain groove, but leading the oil forwards through closed channels in the guidebar to the parts needing lubrication. Several such designs are known, where an oil channel leads to the recess for the nose sprocket, such as French Patent No. 756.690 and U.S. Pat. No. 2,992,660, or to the nose sprocket bearing, such as U.S. Pat. No. 3,044,506 and Swedish Patent No. 438,812, or to the chain groove at a point closer to the nose part, such as German Patent No. 908,296, U.S. Pat. Nos. 2,913,020 and 2,748,810, and Soviet Union No. 406.725. None of these will ensure that the oil reaches all surfaces that need lubrication immediately before the lubrication is needed.

The present invention concerns a guidebar with closed oil channels, arranged to lubricate the inside of the chain just before it starts sliding against the underside of the guidebar, as well as the supporting teeth of the nose sprocket just before they intermesh with the chain.

According to the invention the guidebar is provided with closed channels leading to the corner where the chain groove of the underside meets the nose sprocket recess. The oil is thereby sprayed onto the inside of the chain at the short stretch where it is lifted from the sprocket but has not yet started sliding against the edge of the guidebar, as well as onto the sprocket teeth in the sector where they are freely accessible.

THE DRAWING

The invention is more closely described with reference to

FIG. 1, showing a side view of the guidebar, and

FIG. 2 showing a cross-section of the same. The guidebar extends forwardly from a motor housing (22).

DESCRIPTION OF A PREFERRED EMBODIMENT OF THE INVENTION

Figure 1:
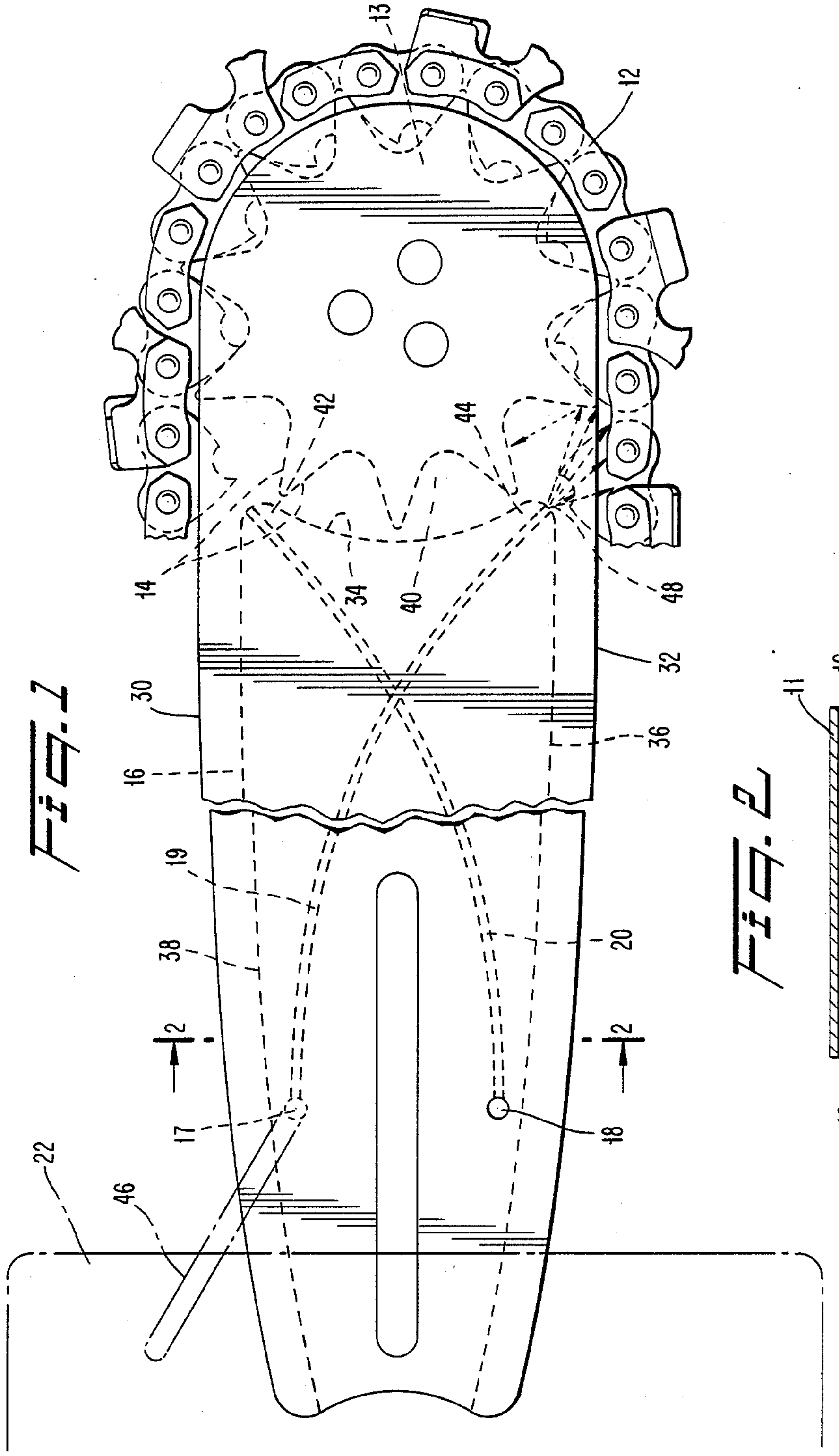
Figure 2:
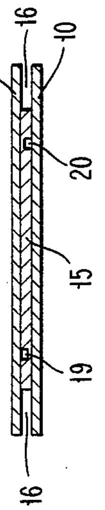

The guidebar comprises three plates welded together, of which the outer plates (10,11) carry and guide the chain (12), and journalled between the outer plates a nose sprocket (13) with teeth, the flanks (14) of which carry the chain during its passage around the nose part from an upper edge (30) to a lower edge (32) thereof. The middle plate (15) forms the bottom of the chain groove (16) and locates the outer plates (10,11) at the correct distance. The middle plate (15) includes a forwardly facing edge (34), a bottom edge (36) and a top edge (38). The forwardly facing edge (34) terminates rearwardly of front edges of the outer plates (10, 11) to form a space (40) between the outer plates in which the sprocket (13) is disposed. The forwardly facing edge (34) intersects the top and bottom edges (38, 36) to form upper and lower corners (42, 44) at a rear end of the space (40).

At the clamping end of the guidebar are two oil inlet holes (17,18) placed so that oil enters only the upper hole. The guidebar can be reversed to equalize the wear, and then the other oil hole will be used.

From each of the oil holes (17,18) leads one closed oil channel (19,20) which has been formed in the middle plate (15) by milling or coining, and which becomes closed by the welding of the outer plates (10,11). The pressure in the oil channels (19,20) must not be so high that the oil seeps out, or that the guidebar is torn open.

The oil channels (19,20) are formed one on each face of the plate and cross without communication as viewed in side elevation. They lead forward to the front corners of the middle plate (15), and the uppermost one (17) of the inlet holes which communicates with an oil supply (46) connected to the motor housing. The oil channel (19) associated with the inlet hole (17) extends forwardly and downwardly to a discharge opening (48) disposed in the lower corner (44). The discharge opening (48) has a discharge direction which includes forward and laterally downward components. Therefore, oil channel (19) ends at the corner (48) with such a forward and downward inclination that oil is sprayed on that side of the chain facing the guidebar as well as on the flanks (14) of the teeth of the nose sprocket (13).

During its journey around the nose part, the chain (12) has been carried by the tooth flanks (14) of the nose sprocket (13) without contact with the contours of the outer plates (10,11), and the oil can thus reach the sliding surfaces of the sidelinks before the chain (12) starts sliding against the guidebar edge.

Through this improvement of the lubrication the durability and safety of the guidebar and chain are materially improved.

I claim:

1. A guidebar for chainsaws comprising a middle plate and two outer plates all welded together, front ends of said outer plates defining a nose of said guidebar, a front end of said middle plate terminating rearwardly of said front ends of said outer plates to define a space between said outer plates, a toothed nose sprocket mounted in said space for guiding a sawchain from an upper edge to a lower edge of said guidebar, at least one oil channel formed in said middle plate and extending forwardly to a discharge opening disposed in said middle plate at a lower rear side of said space, the discharge direction of said discharge opening having a forward component and a laterally downward component for applying oil to a lower portion of said sprocket and to a portion of said lower edge of said guidebar disposed rearwardly of said sprocket.

2. A guidebar according to claim 1, wherein said middle plate includes a bottom facing edge and a forward facing edge intersecting one another to define a corner of said middle plate, said discharge opening being disposed in said corner.

3. A guidebar according to claim 2, wherein said oil channel is disposed in one side of said middle plate, and an additional oil channel is disposed in an opposite side of said middle plate and oriented such that a rotation of said middle plate by 180 degrees relative to said outer plates about a front-to-rear extending axis causes said additional oil channel and said first-named channel to exchange places.

4. A guidebar according to claim 3, wherein said first-named oil channel and said additional oil channel crisscross as said guidebar is viewed in side elevation.

5. A guidebar according to claim 1, wherein said oil channel includes an inlet adjacent a top edge of said middle plate, said oil channel extending forwardly and downwardly from said inlet to said discharge opening.

6. A chainsaw comprising a motor housing, a guidebar connected to said motor housing and projecting forwardly therefrom, a sawchain extending around said guidebar, and oil supply means on said motor housing, said guidebar comprising a middle plate and two outer plates all welded together, front ends of said outer plates defining a nose of said guidebar, a front end of said middle plate terminating rearwardly of said front ends of said outer plates to define a space between said outer plates, a toothed nose sprocket mounted in said space for guiding a sawchain from an upper edge to a lower edge of said guidebar, at least one oil channel formed in said middle plate and including an inlet communicating with said oil supply means, and a discharge opening formed in said middle plate at a lower rear side of said space.

7. A chainsaw according to claim 6, wherein said discharge opening has a forward component and a laterally downward component for applying oil to said sprocket and said sawchain as said sawchain travels away from said sprocket.

* * * * *